United States Patent
Cawthorne et al.

(10) Patent No.: US 8,078,371 B2
(45) Date of Patent: Dec. 13, 2011

(54) METHOD AND APPARATUS TO MONITOR OUTPUT OF AN ELECTRO-MECHANICAL TRANSMISSION

(75) Inventors: William R. Cawthorne, Milford, MI (US); Leonard G. Wozniak, Ann Arbor, MI (US); Paul A Stanowski, Trenton, MI (US); Hanne Buur, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 799 days.

(21) Appl. No.: 11/930,618

(22) Filed: Oct. 31, 2007

(65) Prior Publication Data

US 2009/0112412 A1 Apr. 30, 2009

(51) Int. Cl.
G06F 7/00 (2006.01)
(52) U.S. Cl. ............... 701/54; 701/22; 477/3; 477/5; 477/6; 903/902; 180/65.28
(58) Field of Classification Search .............. 701/22, 701/54, 68; 477/3, 5, 6, 102, 107, 109; 903/902, 903/945; 180/65.28, 65.265
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |

(Continued)

*Primary Examiner* — Gertrude Arthur Jeanglaud (57) ABSTRACT

Controlling a hybrid powertrain includes monitoring an operator torque request, determining maximum and minimum allowable transmission output torques based upon the operator torque request, determining a commanded transmission output torque, and comparing the commanded transmission output torque and each of the maximum and minimum allowable transmission output torques.

16 Claims, 5 Drawing Sheets

U.S. PATENT DOCUMENTS

| | | |
|---|---|---|
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1* | 9/2008 | Sah ................................... 477/3 |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1* | 3/2009 | Heap ................................ 477/5 |
| 2009/0069989 A1* | 3/2009 | Heap ................................ 701/51 |
| 2009/0070019 A1 | 3/2009 | Heap |
| 2009/0075773 A1* | 3/2009 | Martini et al. ................. 475/120 |
| 2009/0082170 A1 | 3/2009 | Heap |
| 2009/0088294 A1 | 4/2009 | West |
| 2009/0118917 A1 | 5/2009 | Sah |
| 2009/0144002 A1 | 6/2009 | Zettel |

* cited by examiner

METHOD AND APPARATUS TO MONITOR OUTPUT OF AN ELECTRO-MECHANICAL TRANSMISSION

TECHNICAL FIELD

This disclosure relates to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output. The output is operatively connected to a driveline for a motor vehicle. One exemplary powertrain includes a two-mode, compound-split, electro-mechanical transmission which utilizes an input member for receiving motive torque from a prime mover power source, preferably an internal combustion engine, and an output member for delivering motive torque from the transmission to the vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in an electrical energy storage device. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines.

The exemplary electro-mechanical transmission is selectively operative in fixed gear and continuously variable operating state ranges through selective control of torque transfer clutch states, via a hydraulic circuit. The fixed gear operating state range occurs when rotational speed of the transmission output member is a fixed ratio of rotational speed of the input member from the engine, due to application and release states of one or more torque transfer clutches. The continuously variable operating state ranges occur when rotational speed of the transmission output member is variable based upon operating speeds of one or more of the electric machines. The electric machines are connected to the output shaft via application of one or more clutches. Selective clutch control is effected through a hydraulic circuit.

SUMMARY

A powertrain includes an electro-mechanical transmission mechanically-operatively coupled to an internal combustion engine and an electric machine adapted to transmit mechanical power flow to an output through selective actuation of a plurality of torque-transfer clutches. A method of controlling the powertrain includes monitoring an operator torque request, determining maximum and minimum allowable transmission output torques based upon the operator torque request, determining a commanded transmission output torque, and comparing the commanded transmission output torque and each of the maximum and minimum allowable transmission output torques.

BRIEF DESCRIPTION OF THE DRAWINGS

One or more embodiments will now be described, by way of example, with reference to the accompanying drawings, in which.

DETAILED DESCRIPTION

Figure 1:
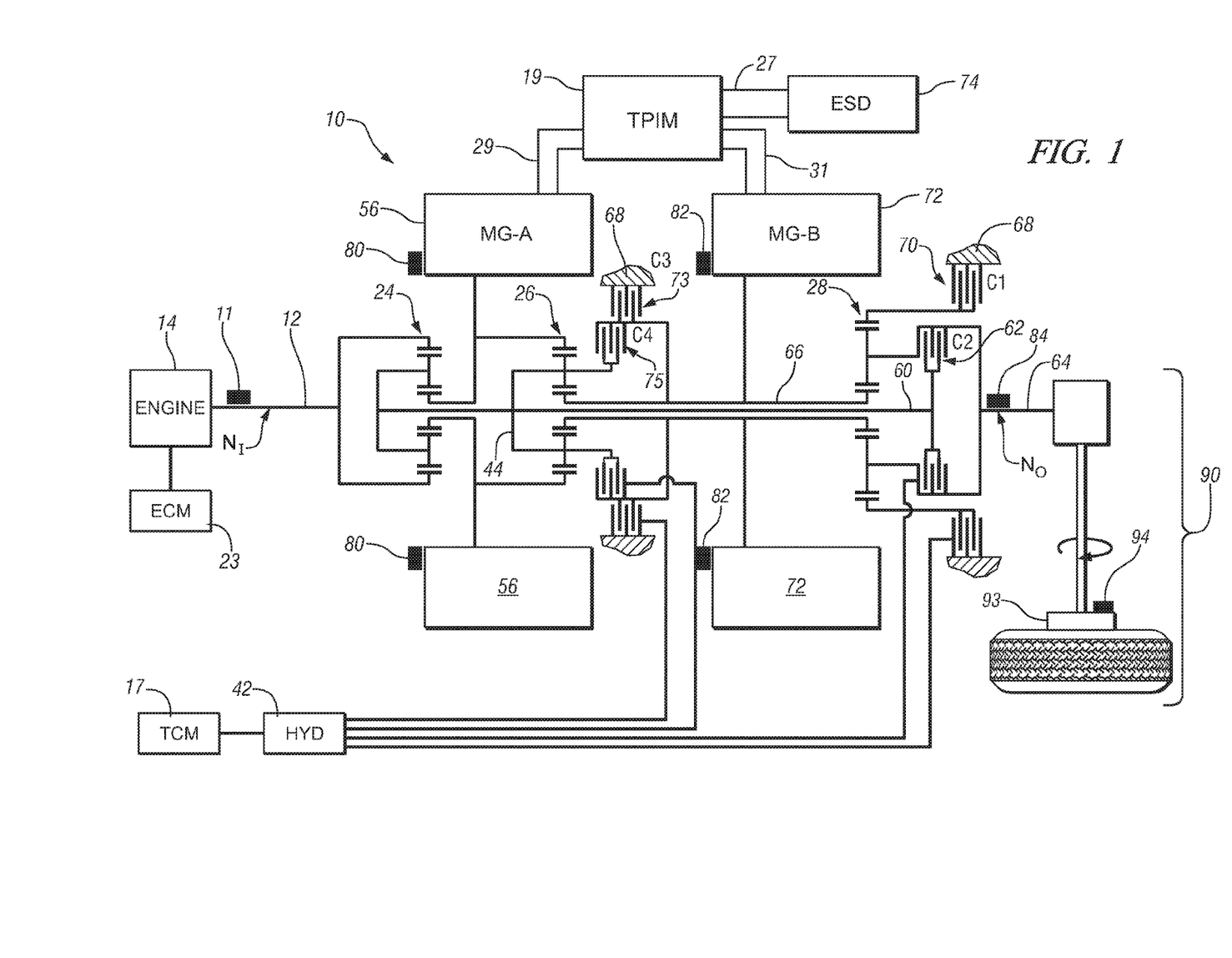
FIG. 1 is a schematic diagram of an exemplary powertrain, in accordance with the present disclosure.
Figure 2:
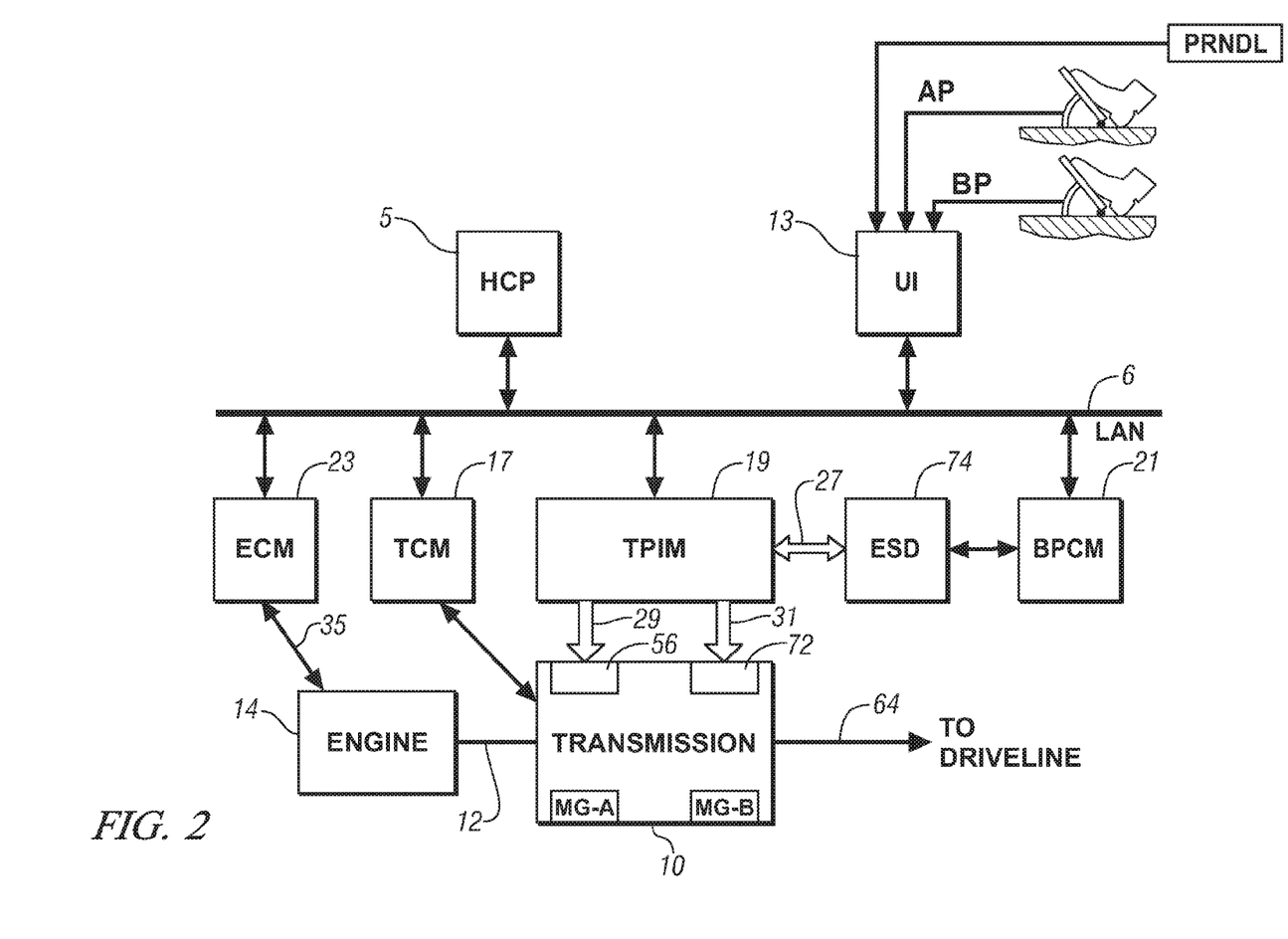
FIG. 2 is a schematic diagram of an exemplary architecture for a control system and powertrain, in accordance with the present disclosure.

Referring now to the drawings, wherein the depictions are for the purpose of illustrating certain exemplary embodiments only and not for the purpose of limiting the same, FIGS. 1 and 2 depict a system comprising an engine 14, transmission 10 including electric machines MG-A 56 and MG-B 72, a control system, and hydraulic control circuit 42. The exemplary hybrid powertrain system is configured to execute the control scheme described and depicted herein.

The exemplary two-mode, compound-split, electro-mechanical hybrid transmission 10 embodying the concepts of the present invention is depicted in FIG. 1. Transmission 10 is adapted to transmit torque from the internal combustion engine 14 and electric machines MG-A 56 and MG-B 72 to an output, e.g., a driveline for a vehicle, through selective control of hydraulically-controlled torque transfer clutches C1 70, C2 62, C3 73, and C4 75. As used herein, clutches refer to any type of friction torque transfer device including single or compound plate clutches or packs, band clutches, and brakes, for example. The transmission 10 includes an input shaft 12 having an input speed, $N_I$ that is preferably driven by the internal combustion engine 14, and an output shaft 64 having an output rotational speed, $N_O$.

The exemplary engine 14 comprises a multi-cylinder internal combustion engine selectively operative in several states to transmit torque to the transmission 10 via shaft 12, and can be either a spark-ignition or a compression-ignition engine. The engine 14 has a crankshaft, not shown, which is operatively connected to the transmission input shaft 12. The crankshaft is monitored by a sensing device 11 adapted to monitor rotational position and speed, $N_E$, thereof. The output of the engine 14, comprising speed $N_E$ and output torque can differ from transmission input speed $N_I$ and engine input torque $T_E$ when a torque management device (not shown) is placed therebetween.

The transmission 10 comprises three planetary-gear sets 24, 26 and 28, and four torque-transmitting devices, i.e., clutches C1 70, C2 62, C3 73, and C4 75. The hydraulic control system 42, preferably controlled by transmission control module ('TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices selectively groundable to the transmission case 68. Each of the clutches C1 70, C2 62, C3 73, and C4 75 is preferably hydraulically applied, receiving pressurized hydraulic fluid via the hydraulic control circuit 42.

The first and second electric machines MG-A 56 and MG-B 72 comprise motor/generator devices, also referred to herein as MG-A 56 and MG-B 72, which are operatively connected to the transmission 10 via at least one of the planetary gears 24, 26, and 28. Each of the machines MG-A 56 and MG-B 72 include a stator (not shown), a rotor (not shown), and a resolver assembly 80, 82. The motor stator for each machine is grounded to outer transmission case 68, and includes a stator core with coiled electrical windings extending therefrom. The rotor for MG-A 56 is supported on a hub plate gear that is operably attached to shaft via the second planetary gear set 26. The rotor for MG-B 72 is attached to sleeve shaft hub 66. The resolver assemblies 80, 82 are appropriately positioned and assembled on MG-A 56 and MG-B 72. Each resolver assembly 80, 82 may be a known variable reluctance device including a resolver stator, operably connected to the stator of each machine MG-A 56 and MG-B 72, and a resolver rotor, operably connected to the rotor of each electric machine MG-A 56 and MG-B 72 described above. Each resolver 80, 82 comprises a sensing device adapted to sense rotational position of the resolver stator relative to the resolver rotor, and identify the rotational position. The signals output from the resolvers 80 and 82 are interpreted to provide rotational speeds for MG-A 56 and MG-B 72, referred to as $N_A$ and $N_B$, respectively. Transmission output shaft 64 is operably connected to a vehicle driveline 90 to provide an output torque, $T_O$, to vehicle wheels. There is a transmission output speed sensor 84 adapted to monitor rotational speed and rotational direction of the output shaft 64. Each of the vehicle wheels, one of which is shown in FIG. 1 at 93, is preferably equipped with a sensor 94 adapted to monitor wheel speed, $V_{SS\text{-}WHL}$, the output of which is monitored by one of the control modules of the control system to determine vehicle speed, and absolute and relative wheel speeds for braking control, traction control, and vehicle acceleration management.

The transmission 10 receives the input torques from the torque-generative devices, including the engine 14 and the MG-A 56 and MG-B 72, as a result of energy conversion from fuel or electrical potential stored in an electrical energy storage device ('ESD') 74. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters (not shown) and respective motor control modules (not shown) configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries contained within the ESD 74 as well as the MG-A 56 and MG-B 72. The distributed control module architecture includes engine control module ('ECM') 23, transmission control module ('TCM') 17, battery pack control module ('BPCM') 21, and TPIM 19. A hybrid control module ('HCP') 5 provides supervisory control and coordination of the aforementioned control modules. A user interface ('UI') 13 is operatively connected to a plurality of devices through which a vehicle operator typically controls and directs operation of the powertrain, including the transmission 10. The devices include an accelerator pedal ('AP') to determine an operator torque request, an operator brake pedal ('BP'), transmission gear selector ('PRNDL'), and, a vehicle speed cruise control (not shown). The transmission gear selector (PRNDL) may have a discrete number of operator-selectable positions, including the rotational direction of the output shaft 64 to enable one of a forward and a reverse direction.

The aforementioned control modules communicate with other control modules, sensors, and actuators via a local area network ('LAN') bus 6. The LAN bus 6 allows for structured communication of control parameters and commands between the various control modules. The specific communication protocol utilized is application-specific. The LAN bus 6 and appropriate protocols provide for robust messaging and multi-control module interfacing between the aforementioned control modules, and other control modules providing functionality such as antilock brakes, traction control, and vehicle stability. Multiple communications buses may be used to improve communications speed and provide some level of signal redundancy and integrity.

The HCP 5 provides supervisory control of the hybrid powertrain system, serving to coordinate operation of the ECM 23, TCM 17, TPIM 19, and BPCM 21. Based upon various input signals from the UI 13 and the powertrain, including the ESD 74, the HCP 5 generates various commands, including: the operator torque request ('$T_{O\_REQ}$'), commanded output torque ('$T_{CMD}$') to driveline 90, the engine input torque $T_I$, clutch torques ('$T_{CL\_N}$') for the N torque-transfer clutches C1 70, C2 62, C3 73, C4 75 of the transmission 10; and motor torques $T_A$ and $T_B$ for MG-A 56 and MG-B 72, respectively. The TCM 17 is operatively connected to the hydraulic control circuit 42 and provides various functions including monitoring various pressure sensing devices (not shown) and generating and communicating control signals to various solenoids thereby controlling pressure switches and control valves contained within the hydraulic control circuit 42.

The ECM 23 is operably connected to the engine 14, and functions to acquire data from a variety of sensors and control a variety of actuators of the engine 14 over a plurality of discrete lines collectively shown as aggregate line 35. The ECM 23 receives the engine input torque command from the HCP 5, and generates a desired axle torque, and an indication of actual engine input torque, $T_I$, provided to the transmission, which is communicated to the HCP 5. For simplicity, ECM 23 is shown generally having bi-directional interface with engine 14 via aggregate line 35. Various other parameters that may be sensed by ECM 23 include engine coolant temperature and engine input speed to shaft 12, which translate to transmission input speed, manifold pressure, ambient air temperature, and ambient pressure. Various actuators that may be controlled by the ECM 23, while not separately shown, include fuel injectors, ignition modules, and throttle control modules.

The TCM 17 is operably connected to the transmission 10 and functions to acquire data from a variety of sensors and provide command signals to the transmission 10. Inputs from the TCM 17 to the HCP 5 include estimated clutch torques for each of the clutches, i.e., C1 70, C2 62, C3 73, and C4 75, and rotational output speed, No, of the output shaft 64. Other actuators and sensors may be used to provide additional information from the TCM 17 to the HCP 5 for control purposes. The TCM 17 monitors inputs from pressure switches and selectively actuates pressure control solenoids and shift solenoids to actuate the various clutches C1 70, C2 62, C3 73, and C4 75 to achieve various transmission operating modes, as described hereinbelow.

The BPCM 21 is signally connected one or more sensors (not shown) operable to monitor electrical current or voltage parameters of the ESD 74 to provide information about the state of the batteries contained within the ESD 74 to the HCP 5. Such information includes battery state-of-charge, battery voltage and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer generally comprising a microprocessor or central processing unit, storage mediums comprising read only memory ('ROM'), random access memory ('RAM'), electrically programmable read only memory ('EPROM'), high speed clock, analog to digital ('A/D') and digital to analog ('D/A') circuitry, and input/output circuitry and devices ('I/O') and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN bus 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to the occurrence of an event.

The exemplary two-mode, compound-split, electro-mechanical transmission 10 operates in one of several operating range states comprising fixed gear operation and continuously variable operation, described with reference to Table 1, below.

TABLE 1

| Transmission Operating Range State | Applied Clutches | |
| --- | --- | --- |
| Mode I - Engine Off (MI_Eng_Off) | C1 70 | |
| Mode I - Engine On (MI_Eng_On) | C1 70 | |
| Fixed Gear Ratio 1 (FG1) | C1 70 | C4 75 |
| Fixed Gear Ratio 2 (FG2) | C1 70 | C2 62 |

TABLE 1-continued

| Transmission Operating Range State | Applied Clutches | |
| --- | --- | --- |
| Mode II - Engine Off (MII_Eng_Off) | C2 62 | |
| Mode II - Engine On (MII_Eng_On) | C2 62 | |
| Fixed Gear Ratio 3 (FG3) | C2 62 | C4 75 |
| Fixed Gear Ratio 4 (FG4) | C2 62 | C3 73 |

The various transmission operating range states described in the table indicate which of the specific clutches C1 70, C2 62, C3 73, C4 75 are applied for each of the operating range states. A first mode, i.e., Mode I, is selected when clutch C1 70 only is applied in order to "ground" the outer gear member of the third planetary gear set 28. The engine 14 can be either on or off. A second mode, i.e., Mode II, is selected when clutch C2 62 only is applied to connect the shaft 60 to the carrier of the third planetary gear set 28. Again, the engine 14 can be either on or off. For purposes of this description, Engine Off is defined by engine input speed, $N_E$, being equal to zero revolutions per minute ('RPM'), i.e., the engine crankshaft is not rotating.

Modes I and II refer to transmission operating states in which the transmission functions are controlled by one applied clutch, i.e., either clutch C1 62 or C2 70, and by the controlled speed and torque of the electric machines MG-A 56 and MG-B 72, which can be referred to as a continuously variable transmission mode. Certain ranges of operation are described below in which fixed gear ratios are achieved by applying an additional clutch. This additional clutch may be the unapplied one of clutch C1 70 or clutch C2 62 or clutch C3 73 or C4 75, as depicted in Table 1, above. When the additional clutch is applied, fixed ratio operation of input-to-output speed of the transmission, i.e., $N_I/N_O$, is achieved. The rotational speeds of the electric machines MG-A 56 and MG-B 72, $N_A$ and $N_B$, respectively, are dependent on internal rotation of the mechanism as defined by the clutching and are proportional to the input speed measured at shaft 12.

In response to an operator's action, as captured by the UI 13, the supervisory HCP 5 and one or more of the other control modules determine the commanded output torque, $T_{CMD}$, intended to meet the operator torque request, $T_{O\_REQ}$, to be executed at output shaft 64. Final vehicle acceleration is affected by other factors including, e.g., road load, road grade, and vehicle mass. The operating mode is determined for the transmission 10 based upon a variety of operating characteristics of the powertrain. This includes the operator torque request, typically communicated through the inputs to the UI 13 as previously described. The operating mode may be predicated on a powertrain torque demand caused by a command, e.g., from the HCP 5, to operate the electric machines MG-A 56 and MG-B 76 in an electrical energy generating mode or in a torque generating mode. The operating mode can be determined by an optimization algorithm or routine operable to determine optimum system efficiency based upon operator demand for power, battery state of charge, and energy efficiencies of the engine 14 and electric machines MG-A 56 and MG-B 72. The control system manages torque inputs from the engine 14 and MG-A 56 and MG-B 72 based upon an outcome of the executed optimization routine, and system optimization occurs to optimize system efficiencies thereby improving fuel economy and managing battery charging. Furthermore, operation can be determined based upon a fault in a component or system. The HCP 5 monitors the parametric states of the torque-generative devices, and determines the output of the transmission required to arrive at the desired output torque, as described hereinbelow. Under the direction of the HCP 5, the transmission 10 operates over a range of output speeds from slow to fast in order to meet the operator demand.

As should be apparent from the description above, the ESD 74 and electric machines MG-A 56 and MG-B 72 are electrically-operatively coupled for power flow therebetween. Furthermore, the engine 14, the electric machines MG-A 56 and MG-B 72, and the electro-mechanical transmission 14 are mechanically-operatively coupled to transmit power therebetween to generate a power flow to the output shaft 64. In Mode I operation, the transmission 14 operates as an input-split electrically variable transmission ('EVT'). In Mode II operation, the transmission 14 operates as a compound-split EVT. While operating in either of these two modes, the control system performs closed loop control on an engine speed which optimizes fuel economy while still meeting the torque request and given power constraints. The control system then commands the speed of each of the electric machines MG-A 56 and MG-B 72 to vary the input-to-output speed ratio to accelerate the vehicle, in response to the operator torque request. Through use of the two additional clutches, the transmission also has the capability of achieving one of four fixed gear ratios. While operating in a fixed gear, the engine 14 and transmission 10, in combination, act as a parallel hybrid and the electric machines MG-A 56 and MG-B 72 are used only for boosting and braking and electrical regeneration.

In accordance with the present disclosure, a computer program is reduced to machine code and predetermined calibrations stored in memory devices of one or more of the control modules, and regularly executed to operate the electro-mechanical transmission 10. Preferably, the computer program is executed during each 12.5 millisecond loop cycle. An operator torque request is regularly monitored, and comprises the user inputs to the UI 13, which are communicated via the LAN 6 to the control modules. Torque boundaries, comprising maximum and minimum allowable output torques, are determined based upon the operator torque request. The commanded output torque, $T_{CMD}$, to the output shaft 64 is determined and compared to the maximum and minimum allowable output torques to determine when the commanded output torque to the output falls outside one of the maximum and minimum allowable output torques.

Figure 3:
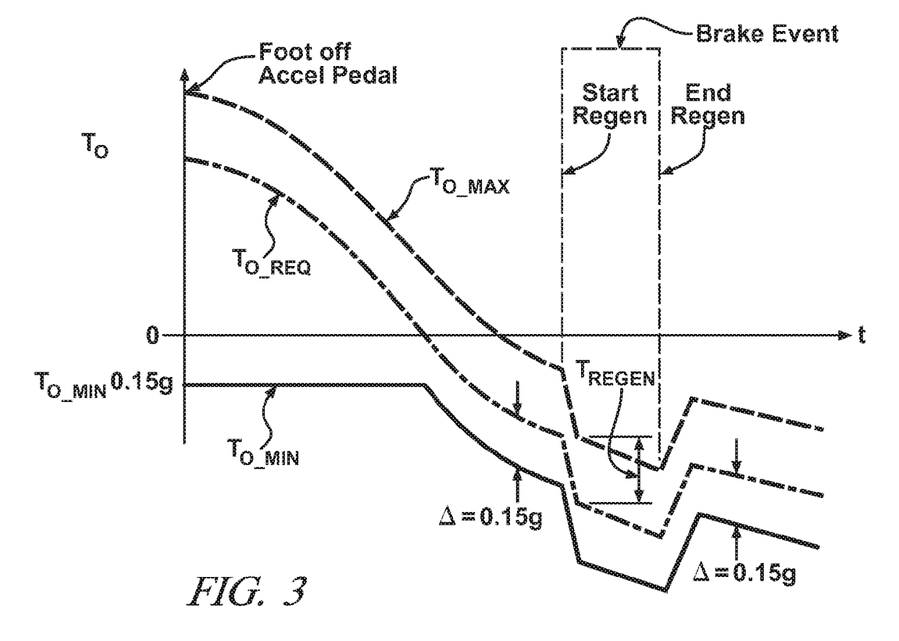
FIG. 3 is a graphical depiction, in accordance with the present disclosure.

Referring now to FIG. 3 and with continued reference to FIGS. 1 and 2, a method of determining the maximum and minimum allowable output torques, $T_{O\_MAX}$ and $T_{O\_MIN}$, is now described. When the transmission 10 is commanded in either a forward or a reverse mode of operation, the maximum allowable output torque, $T_{O\_MAX}$, is determined by arithmetically adding the operator torque request, $T_{O\_REQ}$, and any commanded electrical regeneration torque, $T_{REGEN}$, and a positive allowable torque offset. The resulting maximum allowable output torque, $T_{O\_MAX}$, is preferably filtered and shaped according to a predetermined engine speed profile to meet operator expectations for engine speed during a throttle pedal tip-in or tip-out maneuver, e.g., an engine sail-on response preferred in some engine systems. The rate of change of the maximum allowable output torque, $T_{O\_MAX}$, is restricted through a rate-limiting function which aligns the maximum allowable output torque, $T_{O\_MAX}$, with the actual system response to a dynamically changing operator torque request, $T_{O\_REQ}$, during tip-in and tip-out maneuvers. This determination of the maximum allowable output torque is the same regardless of whether the operator torque request is negative or positive. The command for electrical regeneration torque, $T_{REGEN}$, is typically generated in conjunction with operator braking, based upon a need to recharge the ESD 74, as determined by state of charge of the ESD 74. In the embodiment described, there is a requirement of a maximum allowable torque offset acceleration rate of +0.2 g. The acceleration rate is translated to a threshold value useable by the control module e.g., from the ECM 23, based upon the loop cycle, which is preferably the 12.5 millisecond loop cycle. When the transmission 10 is commanded in either of the forward or reverse mode of operation, and the operator torque request is positive, the minimum allowable output torque comprises a minimum allowable threshold torque, and comprises an acceleration rate of −0.15 g in this embodiment. When the vehicle is commanded in either the forward or reverse direction and the operator torque request is negative, the minimum allowable output torque is determined by subtracting a negative allowable torque offset from the operator torque request. In the embodiment described, the negative allowable torque offset preferably comprises an acceleration rate of −0.15 g. The resulting minimum torque, $T_{O\_MIN}$, is filtered, shaped and rate limited in the same manner described above for $T_{O\_MAX}$. Thus, the maximum and minimum allowable output torques are determined during ongoing operation, including during a braking and regeneration event, as depicted in FIG. 3, for comparison with the commanded output torque, $T_{CMD}$.

Figure 4:
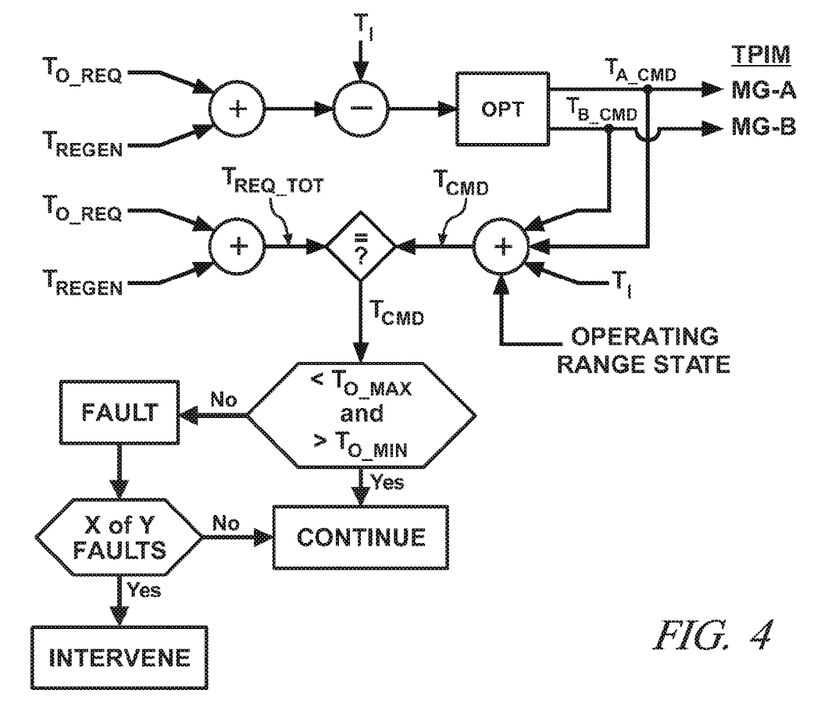
FIG. 4 is an algorithmic flowchart, in accordance with the present disclosure.

Referring now to FIG. 4 and with continues reference to FIGS. 1 and 2, a process for comparing the commanded output torque, $T_{CMD}$, and the operator torque request, $T_{O\_REQ}$, is now described. The operator torque request, $T_{O\_REQ}$, and the requested electrical regeneration torque, $T_{REGEN}$, are added. Actual input torque from the engine, $T_I$, is subtracted therefrom, to determine a required output torque from the electric machines MG-A 56 and MG-B 72, taking into account the operating range state of the transmission 10 and instantaneous operating characteristics of the engine 14 and electric machines MG-A 56 and MG-B 72, including response times. The actual input torque from the engine is determined in the ECM 23 based upon the current engine speed/load operation and any parasitic loads such as hydraulic pump load, and may differ from commanded engine torque output due to system delays and lags. The required output torque is input to an optimization routine, OPT, to determine motor torque commands $T_{A\_CMD}$ and $T_{B\_CMD}$ for the respective electric machines MG-A 56 and MG-B 72 This action is preferably executed in the HCP 5, which transmits the torque commands for the individual machines to the TPIM 19 for execution therein. The process acts to determine whether the torque commands to the engine 14 and the electric machines MG-A 56 and MG-B 72 by the HCP 5 are consistent with and substantially match both the magnitude and direction of the operator torque request, $T_{O\_REQ}$. The commanded output torque, $T_{CMD}$, is determined by combining the torque commands for the individual electric machines and the input torque, $T_I$, from the engine 14, taking into account the operating range state of the transmission 10, i.e., one of the fixed gear and continuously variable operating range states. The operator torque request, $T_{O\_REQ}$, and the commanded electrical regeneration torque, $T_{REGEN}$, are added, preferably in another control module e.g., the ECM 23, to determine a total requested torque, $T_{REQ\_TOT}$. The total requested torque, $T_{REQ\_TOT}$ is compared to the commanded output torque, $T_{CMD}$, to determine whether the commanded output torque, $T_{CMD}$, matches the total requested torque, $T_{REQ\_TOT}$, within the maximum and minimum allowable output torques, i.e., $T_{O\_MAX}$ and $T_{O\_MIN}$, which are determined with reference to FIG. 3, above.

The operational strategy includes detecting when the commanded output torque, $T_{CMD}$, falls outside one of the maximum and minimum allowable output torques, $T_{O\_MAX}$ and $T_{O\_MIN}$, respectively, more than X times out of Y preceding executions of the code, i.e., either exceeds the maximum allowable output torque or is less than the minimum allowable output torque. This is done in context of an exemplary requirement to detect an unintended commanded acceleration rate of 0.2 g within 200 milliseconds of its inception. The unintended commanded acceleration rate may result from a RAM corruption, a ROM corruption or a processor malfunction such as an instruction set corruption. The preferred loop cycle for executing the above is the 12.5 millisecond loop cycle. This execution cycle time permits multiple determinations of the operator torque request, $T_{O\_REQ}$, and the commanded output torque, $T_{CMD}$, reducing a likelihood of a random error in measurement, signal transmission, or calculation having an ongoing effect. In one embodiment, intended only for illustration, the control system monitors output of code execution and identifies a fault when the commanded output torque, $T_{CMD}$, falls outside one of the maximum and minimum allowable output torques twelve (12) times out of sixteen (16) preceding executions of the code.

The HCP 5 control module intervenes when the commanded output torque, $T_{CMD}$, falls outside one of the maximum and minimum allowable output torques, $T_{O\_MAX}$ and $T_{O\_MIN}$, respectively, sufficiently to identify a fault. Intervention comprises, for example, commanding the clutches C1 70, C2 62, C3 73, and C4 75 to neutral states, shutting down the electric motors MG-A 56 and MG-B 72, shutting down the engine 14, and opening up the contactors to the high voltage pack, i.e. disconnecting the ESD 74 from the TPIM 19.

The rotational direction of the output shaft 64 is monitored via output speed sensor 84 to determine whether the operator-requested rotational direction matches the commanded direction, to detect and prevent operation in a direction unintended by the operator. There may be operating conditions in which the dynamic behavior of the system, e.g., aggressive accelerator pedal tip-ins and tip-outs, causes transient differences in the direction sign of the torque output which can lead to falsely detecting a fault. This operation is addressed, as described hereinbelow.

Figure 5A:
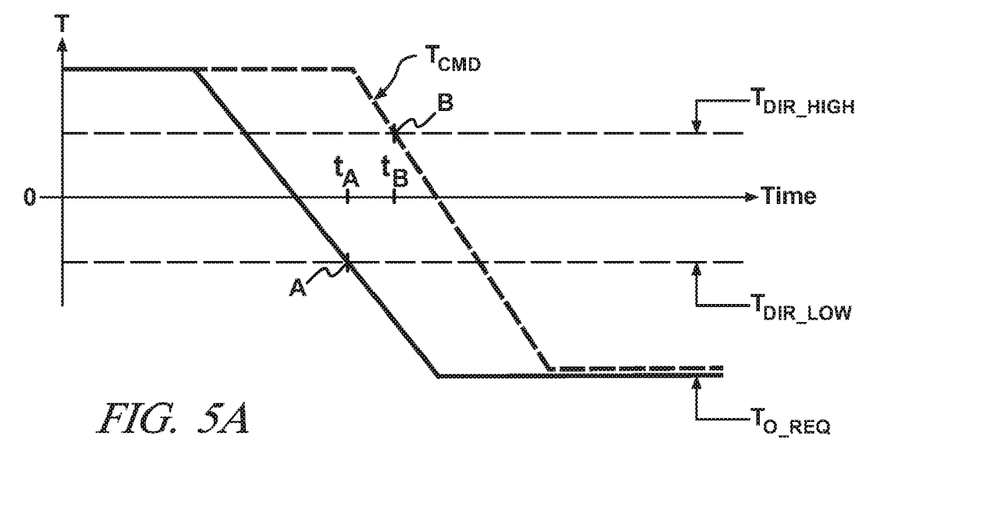
FIGS. 5A and 5B are graphical depictions, in accordance with the present disclosure.

FIG. 5A graphically depicts monitoring rotational direction of the output shaft 64 to determine whether the operator-requested rotational direction matches the commanded direction when operating in a forward direction. When the operator torque request, $T_{O\_REQ}$, is positive, the output is in the forward direction, and the transmission gear selector is placed in one of the forward direction gears, the operator torque request, $T_{O\_REQ}$, is compared to a low direction threshold, $T_{DIR\_LOW}$, and the commanded output torque, $T_{CMD}$, is compared to a high direction threshold, $T_{DIR\_HIGH}$. When the operator torque request, $T_{O\_REQ}$, falls below the low direction threshold, $T_{DIR\_LOW}$, a timer is started, as indicated by time $t_A$, occurring at point A. A second time, $t_B$, occurring at point B, is identified when the commanded output torque, $T_{CMD}$ falls below the high direction threshold, $T_{DIR\_HIGH}$. An elapsed time, comprising the time interval from $t_A$ to $t_B$, is compared to a threshold time period, preferably in the range of 150 milliseconds. So long as the elapsed time is less than the threshold time period, there is no concern. When the elapsed time exceeds the threshold time period, then it is determined that there is a mismatch between the operator-requested rotational direction and the commanded direction, and remedial action is undertaken.

Figure 5B:
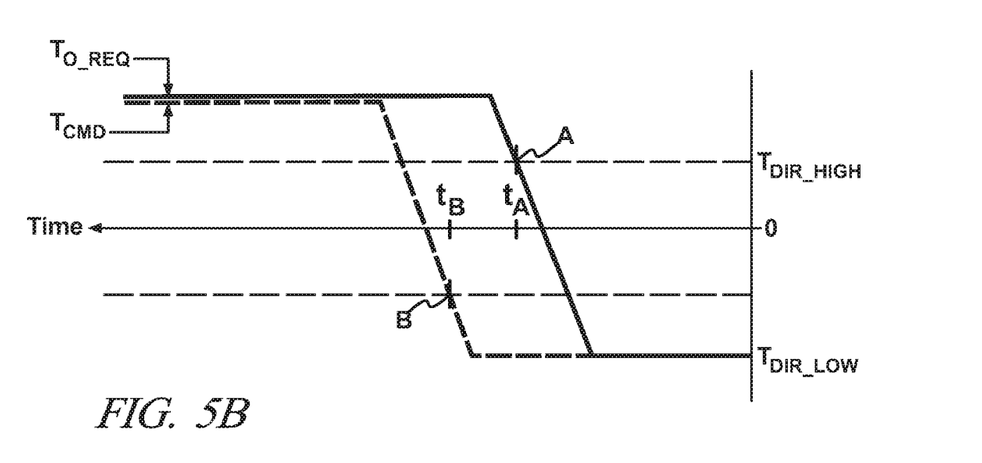

FIG. 5B graphically depicts monitoring rotational direction of the output shaft 64, to determine whether the operator-requested rotational direction matches the commanded direction when operating in a reverse direction. When the operator torque request, $T_{O\_REQ}$, is positive, the output is in the reverse direction, and the transmission gear selector is placed in the reverse direction gear, the operator torque request, $T_{O\_REQ}$, is compared to the high direction threshold, $T_{DIR\_HIGH}$, and the commanded output torque, $T_{CMD}$, is compared to the low direction threshold, $T_{DIR\_LOW}$. When the operator torque request, $T_{O\_REQ}$, falls above the high direction threshold, $T_{DIR\_HIGH}$, the timer is started, as indicated by time, $t_A$, occurring at point A. The second time, $t_B$, occurring at point B, is identified when the commanded output torque, $T_{CMD}$ falls above the low direction threshold, $T_{DIR\_LOW}$. The elapsed time, comprising the time interval from $t_A$ to $t_B$, is compared to the threshold time period, again preferably in the range of 150 milliseconds. So long as the elapsed time is less than the threshold time period, there is no concern. When the elapsed time exceeds the threshold time period, then it is determined that there is a mismatch between the operator-requested rotational direction and the commanded direction, and remedial action is undertaken. The use of the high and low direction thresholds and the elapsed time creates a level of hysteresis in which differences between the directions of the operator torque request and the torque command resulting from time lags occurring during normal operation are accommodated, while allowing timely detection of an error between the commanded direction and the operator-requested direction.

In this embodiment, the low direction threshold comprises an acceleration rate of −0.05 g and the high direction threshold comprises an acceleration rate of +0.05 g. The operator torque request, $T_{O\_REQ}$, is filtered, shaped and rate limited in the same manner described above for $T_{O\_MAX}$. When the commanded output torque, $T_{CMD}$, exceeds the threshold and direction detection is enabled, the control module intervenes to manage the torque output. The direction detection is enabled when the gradient of the operator torque request, $T_{O\_REQ}$, is below a calibratable threshold, meaning the system is in a less dynamic state, i.e., a quasi-steady state. Direction monitoring is preferably deactivated during some dynamic transitional states to eliminate risk of a false detection.

To make the direction detection algorithm robust to transient differences in sign of rotation, the detection is preferably activated during less dynamic operator torque requests, and deactivated during more dynamic operator torque requests. This is achieved by determining the gradient of the operator torque request, $T_{O\_REQ}$, and comparing that to a calibratable threshold. When the gradient exceeds the threshold, the direction detection is disabled. The rationale for disabling the detection during a dynamic operator torque request is that the vehicle cannot move in the wrong direction due to a calculated torque command that is momentarily of the opposite direction. However, if the calculated torque command is corrupt and continues to command the vehicle in the opposite direction of the operator torque request, the detection sets a fault and takes action. To prevent a corruption of the gradient disabling criteria from permanently defeating the detection, the timer is initiated when the detection algorithm is deactivated, and the timer output is logically compared with the gradient disabling criteria, preventing a single point fault.

Figure 6:
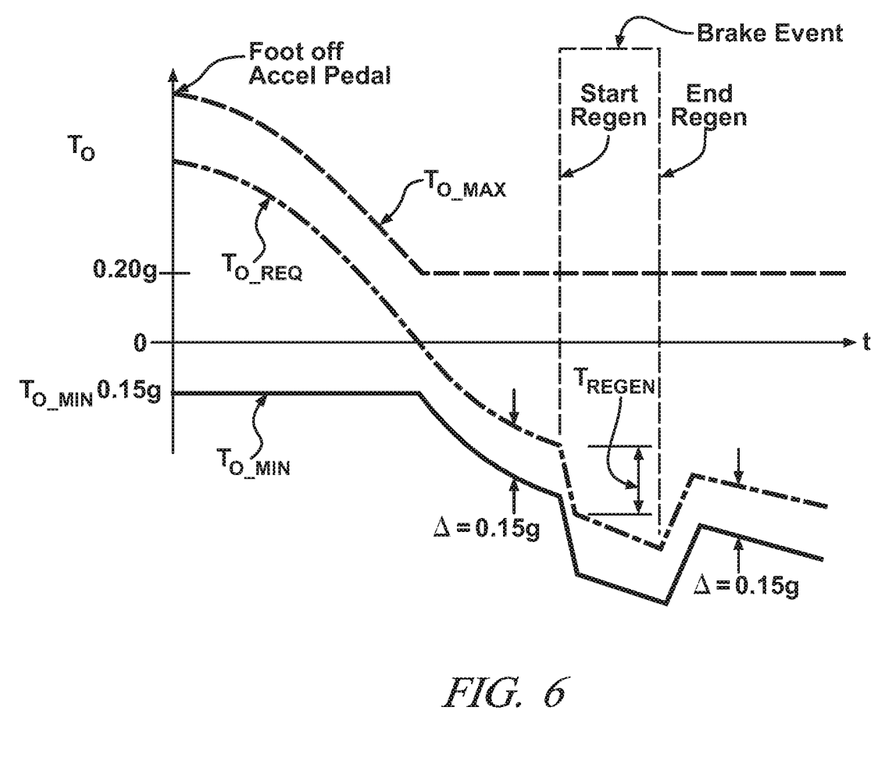
FIG. 6 is a graphical depiction, in accordance with the present disclosure.

Referring now to FIG. 6 and with continued reference to FIGS. 1 and 2, a second embodiment of the method of determining the maximum and minimum allowable output torques, $T_{O\_MAX}$ and $T_{O\_MIN}$, is now described. When the transmission 10 is commanded in either a forward or a reverse mode of operation, the maximum allowable output torque, $T_{O\_MAX}$, is determined by arithmetically adding the operator torque request, $T_{O\_REQ}$, and any commanded electrical regeneration torque, $T_{REGEN}$, and a positive allowable torque offset. The resulting maximum allowable output torque, $T_{O\_MAX}$, is preferably filtered and shaped according to a predetermined engine speed profile to meet operator expectations for engine speed during a throttle pedal tip-in or tip-out maneuver, e.g., an engine sail-on response preferred in some engine systems. The rate of change of the maximum allowable output torque, $T_{O\_MAX}$, is restricted through a rate-limiting function which aligns the maximum allowable output torque, $T_{O\_MAX}$, with the actual system response to a dynamically changing operator torque request, $T_{O\_REQ}$, during tip-in and tip-out maneuvers. This determination of the maximum allowable output torque is the same regardless of whether the operator torque request is negative or positive. The command for electrical regeneration torque, $T_{REGEN}$, is typically generated in conjunction with operator braking, based upon a need to recharge the ESD 74, as determined by state of charge of the ESD 74. In the embodiment described, there is a requirement of a maximum allowable torque offset acceleration rate of +0.2 g when the operator torque request, $T_{O\_REQ}$, is positive, i.e., greater than zero. The acceleration rate is translated to a threshold value useable by the control module e.g., from the ECM 23, based upon the loop cycle, which is preferably the 12.5 millisecond loop cycle. When the transmission 10 is commanded in either of the forward or reverse mode of operation, and the operator torque request is positive, the minimum allowable output torque comprises a minimum allowable threshold torque, which is an acceleration rate of −0.15 g in this embodiment. When the vehicle is commanded in either the forward or reverse direction and the operator torque request is negative, the maximum allowable output torque, $T_{O\_MAX}$, comprises a fixed acceleration rate of 0.2 g. The minimum allowable output torque, $T_{O\_MIN}$ is determined by subtracting a negative allowable torque offset from the operator torque request. In the embodiment described, the negative allowable torque offset preferably comprises an offset acceleration rate of −0.15 g. The resulting minimum allowable output torque, $T_{O\_MIN}$, is filtered, shaped and rate limited in the same manner described above for $T_{O\_MAX}$. Thus, the maximum and minimum allowable output torques are determined during ongoing operation, including during a braking and regeneration event, as depicted in FIG. 6, for comparison with the commanded output torque, $T_{CMD}$. Operation of the system has been previously described with reference to FIGS. 4 and 5A, 5B.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain comprising an electro-mechanical transmission mechanically-operatively coupled to an internal combustion engine and an electric machine adapted to transmit mechanical power flow to an output through selective actuation of a plurality of torque-transfer clutches, the method comprising: monitoring an operator torque request;

determining maximum and minimum allowable transmission output torques based upon the operator torque request, wherein determining the maximum allowable transmission output torque based upon the operator torque request comprises combining the operator torque request, and electrical regeneration torque, and a positive torque offset;

determining a commanded transmission output torque; and comparing the commanded transmission output torque and each of the maximum and minimum allowable transmission output torques;

wherein the positive torque offset comprises an acceleration rate of substantially 0.2 g.

2. Method for controlling a powertrain comprising an electro-mechanical transmission mechanically-operatively coupled to an internal combustion engine and an electric machine adapted to transmit mechanical power flow to an output through selective actuation of a plurality of torque-transfer clutches, the method comprising:

monitoring an operator torque request;

determining maximum and minimum allowable transmission output torques based upon the operator torque request, wherein determining the maximum allowable transmission output torque based upon the operator torque request comprises combining the operator torque request, an electrical regeneration torque, and a positive torque offset;

determining a commanded transmission output torque; and comparing the commanded transmission output torque and each of the maximum and minimum allowable transmission output torques;

wherein determining the minimum allowable transmission output torque based upon the operator torque request comprises establishing a minimum threshold torque when the operator torque request is positive.

3. The method of claim 2, wherein the minimum threshold torque comprises an acceleration rate of substantially −0.15 g.

4. Method for controlling a powertrain comprising an electro-mechanical transmission mechanically-operatively coupled to an internal combustion engine and an electric machine adapted to transmit mechanical power flow to an output through selective actuation of a plurality of torque-transfer clutches, the method comprising:

monitoring an operator torque request;

determining maximum and minimum allowable transmission output torques based upon the operator torque request;

determining a commanded transmission output torque; and comparing the commanded transmission output torque and each of the maximum and minimum allowable transmission output torques;

wherein determining the minimum allowable transmission output torque based upon the operator torque request comprises subtracting a negative torque offset from the operator torque request when the operator torque request is negative.

5. Method for controlling a powertrain comprising an electro-mechanical transmission mechanically-operatively coupled to an internal combustion engine and an electric machine adapted to transmit mechanical power flow to an output through selective actuation of a plurality of torque-transfer clutches, the method comprising: monitoring an operator torque request; determining maximum and minimum allowable transmission output torques based upon the operator torque request;

determining a commanded transmission output torque;

comparing the commanded transmission output torque and each of the maximum and minimum allowable transmission output torques; and intervening when the commanded transmission output torque falls outside of one of the maximum and minimum allowable transmission output torques X times out of Y preceding executions of the code.

6. The method of claim 5, wherein intervening comprises adjusting an electric machine torque command.

7. The method of claim 6, adjusting an electric machine torque command comprises shutting down the electric machine.

8. The method of claim 7, further comprising deactivating torque transfer clutches.

9. The method of claim 7, further comprising adjusting an internal combustion engine output torque command.

10. The method of claim 9, wherein adjusting an internal combustion engine torque command comprises shutting down the internal combustion engine.

11. Method for controlling a powertrain comprising an electro-mechanical transmission mechanically-operatively coupled to an internal combustion engine and an electric machine adapted to transmit mechanical power flow to an output through selective actuation of a plurality of torque-transfer clutches, the method comprising:
monitoring an operator torque request;
determining maximum and minimum allowable transmission output torques based upon the operator torque request;
determining a commanded transmission output torque; and
comparing the commanded transmission output torque and each of the maximum and minimum allowable transmission output torques;
wherein monitoring the operator torque request comprises monitoring a magnitude and a rotational direction of the operator torque request.

12. The method of claim 11, further comprising:
determining a commanded rotational direction of the transmission output torque, and
comparing a rotational direction of the operator torque request to the commanded rotational direction of the transmission output torque.

13. The method of claim 12, further comprising deactivating the monitoring of the rotational direction of the operator torque request when a change in the operator torque request exceeds a predetermined threshold.

14. Article of manufacture, comprising a storage medium having a machine-executable program encoded therein to monitor operation of an electro-mechanical transmission adapted to transmit mechanical power flow to an output shaft, the program comprising:
code to monitor an operator torque request and an operator command for rotational direction;
code to determine maximum and minimum allowable transmission output torques based upon the operator torque request;
code to determine a commanded transmission output torque and a rotational direction of the output;
code to compare the commanded transmission output torque and each of the maximum and minimum allowable transmission output torques; and
code to compare the rotational direction of the output to the operator command for rotational direction;
wherein the code to determine the maximum allowable transmission output torque based upon the operator torque request comprises arithmetically adding the operator torque request, any commanded electrical regeneration torque, and a positive torque offset.

15. Article of manufacture, comprising a storage medium having a machine-executable program encoded therein to monitor operation of an electro-mechanical transmission adapted to transmit mechanical power flow to an output shaft, the program comprising:
code to monitor an operator torque request and an operator command for rotational direction;
code to determine maximum and minimum allowable transmission output torques based upon the operator torque request;
code to determine a commanded transmission output torque and a rotational direction of the output;
code to compare the commanded transmission output torque and each of the maximum and minimum allowable transmission output torques; and
code to compare the rotational direction of the output to the operator command for rotational direction;
wherein the code to determine the minimum allowable transmission output torque based upon the operator torque request comprises establishing a minimum threshold torque when the operator torque request is positive.

16. Article of manufacture, comprising a storage medium having a machine-executable computer program encoded therein operative to control a powertrain comprising an electro-mechanical transmission mechanically-operatively coupled to an internal combustion engine and a plurality of electric machines each adapted for mechanical power flow to an output through selective actuation of a plurality of torque-transfer clutches; the program comprising:
code to monitor an operator torque request;
code to determine maximum and minimum allowable transmission output torques based upon the operator torque request;
code to determine a regeneration torque;
code to determine electric machine torque commands;
code to determine a commanded transmission output torque based upon the electric machine torque commands;
code to compare the commanded transmission output torque and each of the maximum and minimum allowable transmission output torques; and
code to intervene when the commanded transmission output torque falls outside of one of the maximum and minimum allowable transmission output torques X times out of Y preceding executions of the code.

* * * * *